(12) United States Patent
Jethmalani et al.

(10) Patent No.: US 8,098,440 B2
(45) Date of Patent: Jan. 17, 2012

(54) HIGH-ORDER ABERRATION CORRECTION FOR OPTIMIZATION OF HUMAN VISUAL FUNCTION

(75) Inventors: Jagdish M. Jethmalani, San Diego, CA (US); Andreas W. Dreher, Escondido, CA (US); Lawrence H. Sverdrup, Poway, CA (US)

(73) Assignee: Ophthonix, Inc., Vista, CA (US)

( * ) Notice: Subject to any disclaimer, the term of this patent is extended or adjusted under 35 U.S.C. 154(b) by 0 days.

(21) Appl. No.: 12/755,342

(22) Filed: Apr. 6, 2010

(65) Prior Publication Data

US 2010/0195212 A1      Aug. 5, 2010

Related U.S. Application Data

(63) Continuation of application No. 11/749,721, filed on May 16, 2007, now Pat. No. 7,697,212.

(60) Provisional application No. 60/800,988, filed on May 16, 2006.

(51) Int. Cl.
*G02B 9/00*      (2006.01)
(52) U.S. Cl. ........................................ 359/652; 359/642
(58) Field of Classification Search .................. 359/642, 359/643, 652; 351/159, 176, 177
See application file for complete search history.

(56) References Cited

U.S. PATENT DOCUMENTS

| | | | |
|---|---|---|---|
| 4,022,855 A | 5/1977 | Hamblen | |
| 6,554,425 B1 | 4/2003 | Roffman et al. | |
| 6,682,195 B2 | 1/2004 | Dreher | |
| 6,712,466 B2 | 3/2004 | Dreher | |
| 6,761,454 B2 | 7/2004 | Lai et al. | |
| 6,781,681 B2 | 8/2004 | Horwitz | |
| 6,813,082 B2 | 11/2004 | Bruns | |
| 6,836,371 B2 | 12/2004 | Lai et al. | |
| 6,840,619 B2 | 1/2005 | Dreher | |
| 6,934,088 B2 | 8/2005 | Lai et al. | |
| 6,942,339 B2 | 9/2005 | Dreher | |
| 6,976,641 B2 | 12/2005 | Lai et al. | |
| 6,989,938 B2 | 1/2006 | Bruns | |
| 7,021,764 B2 | 4/2006 | Dreher | |
| 7,034,949 B2 | 4/2006 | Horwitz | |
| 2002/0071095 A1 | 6/2002 | Roffman et al. | |
| 2002/0080464 A1 | 6/2002 | Bruns | |
| 2002/0196412 A1* | 12/2002 | Abitbol | 351/246 |
| 2003/0003295 A1* | 1/2003 | Dreher et al. | 428/332 |
| 2005/0036109 A1* | 2/2005 | Blum et al. | 351/168 |
| 2006/0052547 A1 | 3/2006 | Jethmalani et al. | |

OTHER PUBLICATIONS

Applegate, J. Refract Sur (Sep./Oct. 2000) 16:S547-S551.
Applegate, "Zernike Expansion," Wavefront Congress presentation, http://129.7.217.162/presentations.htm, 2007.
Artal et al., J. Refract. Sur (Sep./Oct. 2003) 19:S585-S587.
Atchison, Clin Exp Optom (2004) 87(3):138-148.
Bachman et al., Optometry (2006) 77:67-70.
Bara et al., Applied Optics (2000) 39(19):3413-3420.
Besenmatter, Optics & Photonics News (Nov. 2000), pp. 30-33.
Binder et al., Visual Acuity and Contrast Sensitivity in Subjects Using Wavefront Customized Spectacles, 2003 Annual AAO Meeting, Anaheim, CA (abstract only).
Charman et al., Ophthalmology (2003) 23:479-493.

(Continued)

*Primary Examiner* — James Greece
(74) *Attorney, Agent, or Firm* — Morrison & Foerster LLP

(57) ABSTRACT

The present invention relates to the optimization of human visual function by correcting and/or optimizing high-order optical aberrations in high performance optical devices. The optimization is particularly useful for high performance devices used under low light conditions such as binoculars, rifle scopes, telescopes, microscopes, night vision goggles and laser eye protection devices.

4 Claims, 9 Drawing Sheets

OTHER PUBLICATIONS

Eliott et al., Opt Vis Sci (1995) 72(3):186-191.
Fahle et al., MIT Press (2002), pp. 197-218.
Flores et al., Applied Optics (2004) 43(30):5618-5630.
Geary, "Introduction to Wavefront Sensors," SPIE Press (1995).
Globerson et al., Vision Improvement with Wavefront Guided Spectacle Lenses, 2005 Annual AAO Meeting, San Diego, CA (abstract only).
Guirao et al., J. Opt. Soc Am A (2002) 19(1):126-128.
Harris et al., Aviat Space and Environ Med (2003) 74(9):947-952.
Horowitz, "Wavefront Sensor Using Near-Field Diffraction Effects," 5th International Congress on Wavefront Sensing and Optimized Refractive Correction, Feb. 21-23, 2004, Whistler, Canada.
Jethmalani et al., Wavefront Guided Spectacle Lenses for Emmetropes and Myopes, 2004 Annual ARVO Meeting, Fort Lauderdale, FL.
Lipshitz, J. Refract. Sur (Nov./Dec. 2002) 18:740-743.
McLellan et al., Nature (May 2002) 417:174-176.
"Ophthonix Studies the Challenge of Night Driving", Optometric Management http://www.optometricmanagement.com/article.aspx?article=71560, 2006.
Osipova et al., Sov. J. Opt. Technol (1991) 58(9):542-544.
Osipova et al., Sov. J. Opt. Technol (1991) 58(2):88-90.
Poonja et al., J. Ref. Sur (Sep./Oct. 2005) 21:S575-S580.
RCA Electro-Optics Handbook, 2nd Ed. (1974), p. 70.
Roorda, "The limits of high contrast photopic letter acuity with adaptive optics," 7th Wavefront Congress, (Jan. 26-29, 2006), http://www.wavefront-congress.org/info/listing.asp under "Ethan Rossi" in Adaptive Optics Applications.
Rossi et al., Poster 5402, ARVO, May 4, 2006 [abstract:www.iovs.org].
Sheedy et al., Optometry (2006) 77(1):23-29.
Stromeyer et al., Vis Research (2003) 43(3):285-298.
Thibos, "Does chromatic aberration hinder or help?," 5th Wavefront Congress, Feb. 2004, Whistler BC, http://129.7.217.162/VOI/index.htm.
Thibos, "Principles of Hartmann-Shack Aberrometry," Wavefront Sensing Congress, 2000, Sante Fe, NM, http://research.optindiana.edu/Library/VSIA/VSIA-2000_SH_tutorial_v2/sId001.htm.
Thibos et al., J. Opt Soc Am A (2002) 19(12):2329-2348 [Figure 9].
Thibos et al., Optometry and Vision Science (Dec. 1999) 76(12).
"VOL-CT," Sarver and Associates, www.sarverassociates.com, 2004.
Vukobratovich, SPIE (1989) 1168:338-351.
Wade, Perception (2000) 29:253-257.
"Wavefront Sciences COAS-HD instrument," Albuquerque, NM, http://www.wavefrontsciences.com/opthalmic/COAS-HD.html, 2005.
Webster et al., Nature Neuroscience (2002) 5(9):839-840.
Williams, Vision Research (1985) 25(2):195-205.
Winn et al., Invest. Ophthalmol. & Visual Sci (1994) 35(3):1132-1137.
Wolf, Ed., Progress in Optics (1989) 27:1-108.
www.birdwatching.com/optics, 2000, 2003, 2005, 2002.
www.wickedlasers.com, 2008.

* cited by examiner

Theoretical   Measured

Theoretical   Measured

Inverse Aberration   High Order Pattern   Theoretical Fringes

HIGH-ORDER ABERRATION CORRECTION FOR OPTIMIZATION OF HUMAN VISUAL FUNCTION

CROSS-REFERENCE TO RELATED APPLICATIONS

This application is a continuation of U.S. Ser. No. 11/749,721 filed 16 May 2007, which claims benefit under 35 U.S.C. §119(e) from provisional application Ser. No. 60/800,988 filed 16 May 2006, the contents of which are incorporated herein by reference.

FIELD OF THE INVENTION

The present invention relates to the optimization of human visual function by correcting and/or optimizing high-order optical aberrations. The optimization is particularly useful for high performance activities especially under low light conditions.

BACKGROUND OF THE INVENTION

The wavefront error of the human eye is analogous to the surface of a drum. The diameter of the drum represents the diameter of the pupil of the eye. If there were no aberrations, the surface of the drum would be flat. However, in almost any normal eye there are optical errors represented by leads or lags in the wavefront, and in the analogy, hills and valleys in the drum surface. Any smooth surface over a circular aperture can be described as a sum of coefficients multiplied by Zernike polynomials. Optical aberrations in the human eye are now almost exclusively described in this manner. The lowest order Zernike aberrations are shown in FIG. 1. Not shown in the "Zernike pyramid" are the first two lines (radial orders) which include the Zernikes piston, tip and tilt. Conventional glasses include prism, sphere and cylinder correction. Prism is simply tip and tilt, while sphere and cylinder are linear combinations of defocus and astigmatism.

Shown in FIG. 1 are the $2^{nd}$ to $4^{th}$ order Zernikes.[1] Astigmatism, sphere, tip & tilt are considered "low-order" aberrations. All other aberrations of higher radial order are known collectively as "high-order" aberrations. Conventional glasses attempt to provide the best possible low-order correction.

Average pupil size significantly decreases with age. Persons of age 18 yrs-40 yrs have pupil diameters in the neighborhood of 6.5 mm for lighting conditions typical of evening on an overcast day (44 $cd/m^2$).[2,3] Average high-order root-mean-square (RMS) wavefront error in a 6.5 mm pupil is of the order of 0.38 microns.[4] Many people have greater levels of high-order aberration. For comparison, to achieve a similar RMS wavefront error in a 3 mm daytime pupil requires a 1.2-diopter sphere error, which is considered large. Whereas residual sphere error can be nullified via the variable focusing power of the lens through the process of accommodation, the eye has no mechanism for changing the amount of high-order aberrations.

Visual acuity characterizes the ability to resolve small objects. Acuity measures only a portion of visual ability. It is, however, one of the more well known measures of vision. Population averages of visual acuity versus age for normal healthy eyes are summarized in FIG. 2 which shows the log MAR VA of 223 subjects ranging from 18 to 80 years of age. The best linear and bilinear fits to the data are shown.[5] The subjects used the best possible conventional low-order correction for the measurements.

In the graph of FIG. 2, 6/6 is the metric equivalent of 20/20. 6/3 is the metric equivalent of 20/10 and represents approximately the predicted Nyquist resolution limit due to the cone density in the human fovea.[6] Theoretically, if there were no optical aberrations, the human eye should be capable of seeing approximately 20/10, although the exact value probably varies from person to person. Until recently, the world's record was 20/8. Young people of age 25-29 typically have the best acuity, and vision generally worsens with increasing age after about age 30. The reason for the decline with age is a topic of debate. The three main theories include increases in high-order aberrations and concomitant reduction in pupil size, increases in intraocular scatter and transmission loss, and loss of cones and/or ganglion cells. Published reports tend to support the first two theories for normal healthy eyes.

The reason for the scatter in the data at any given age, especially for the younger eyes, is probably mostly due to the presence of high-order aberrations. One theory is that if a person was never exposed to good vision when young, the neural development may preclude seeing at or near the Nyquist resolution limit later in life, a condition referred to as refractive amblyopia.[7] Nevertheless, when high-order aberrations are corrected using adaptive optics, the visual acuity of all subjects significantly improves[8]. In a recent study, half of the high-order-corrected subjects consistently demonstrated an acuity exceeding 20/8.[9] Therefore, vision benefit from correction of high-order aberrations is not just theoretical.

One of the largest anticipated benefits of high-order aberration correction is an improvement in contrast sensitivity. In low-light conditions when the pupil diameter and the level of high-order aberrations both increase, contrast sensitivity begins to degrade. This has two deleterious effects. One is that it may no longer be possible to detect certain low-contrast objects which are important in for example driving, hunting and military applications. The very definition of camouflage is to reduce contrast by better matching the surrounding conditions. The other problem is that even if an object can be detected, the detection and recognition process will take longer. Studies consistently show that reaction times are increased when contrast sensitivity is degraded.[10,11]

The three major higher-order aberrations affecting typical people include coma, trefoil and spherical aberration. Coma is a non-symmetric aberration capable of causing significant loss of contrast sensitivity. FIG. 3 shows a high-contrast eye-chart optical simulation for a subject with 0.19 microns RMS of coma in a 6.0 mm pupil.[12] This is within a standard deviation of the average value.[13] The simulation assumes that all other aberrations are fully corrected. The top line is 20/100.

In a low contrast situation, the letters would be even more difficult to recognize, and of course, there are many other possible aberrations besides coma. For comparison, an unaberrated (no aberrations) eye chart simulation based on a 6.0 mm pupil is shown in FIG. 4.

The modulation transfer function (MTF) characterizes how well an optical system preserves contrast versus spatial frequency. The MTF of a diffraction-limited eye having no aberrations with a 6.0 mm pupil is shown in FIG. 5.

The MTF graph with the introduction of just the 0.19 microns of coma in a 6.0 mm pupil is seen in FIG. 6.

The MTF curve is severely depressed at all spatial frequencies, due to the single aberration of coma. If sphere and cylinder are not also optimally corrected, there will in addition be severe contrast losses due to low-order aberrations.

SUMMARY OF THE INVENTION

The present invention provides a personalized correction and optimization of high-order aberrations of the human eye when using binoculars, rifle scopes, telescopes, microscopes, night vision goggles and laser eye protection devices. The present invention will significantly enhance contrast sensitivity and low-contrast visual acuity in these devices. These vision benefits will be realized and will be of significant use in enhancing both military and civilian performances when using the above-identified devices.

TECHNICAL OBJECTIVES

Contrast sensitivity and low-contrast visual acuity is improved when using binoculars with the addition of personalized high-order aberration correction and optimization.

Contrast sensitivity, low-contrast visual acuity and vernier acuity are improved when using rifle scopes with the addition of personalized high-order aberration correction and optimization. Marksmen are able to better group their shots when using high-order aberration correction and optimization.

Contrast sensitivity is improved in night vision goggles by the addition of personalized high-order aberration correction and optimization, and with MTF control to limit aliasing in the IIT.

Contrast sensitivity and low-contrast visual acuity is improved when using laser eye protection devices with the addition of personalized high-order aberration correction and optimization.

DETAILED DESCRIPTION OF THE INVENTION

Figure 1:
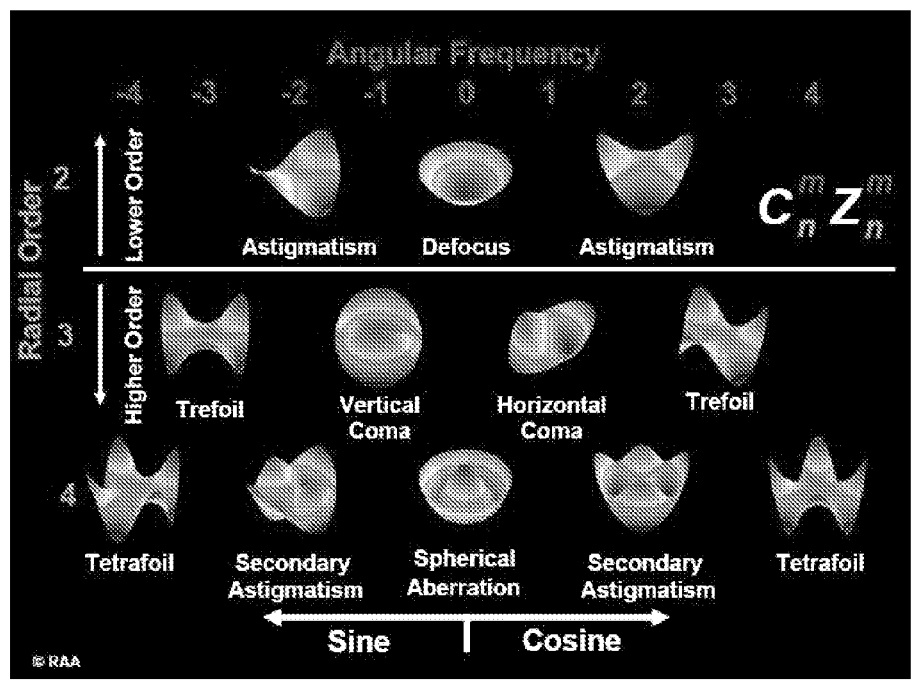
FIG. 1 shows graphic representations of $2^{nd}$ through $4^{th}$ order Zernike aberrations.
Figure 2:
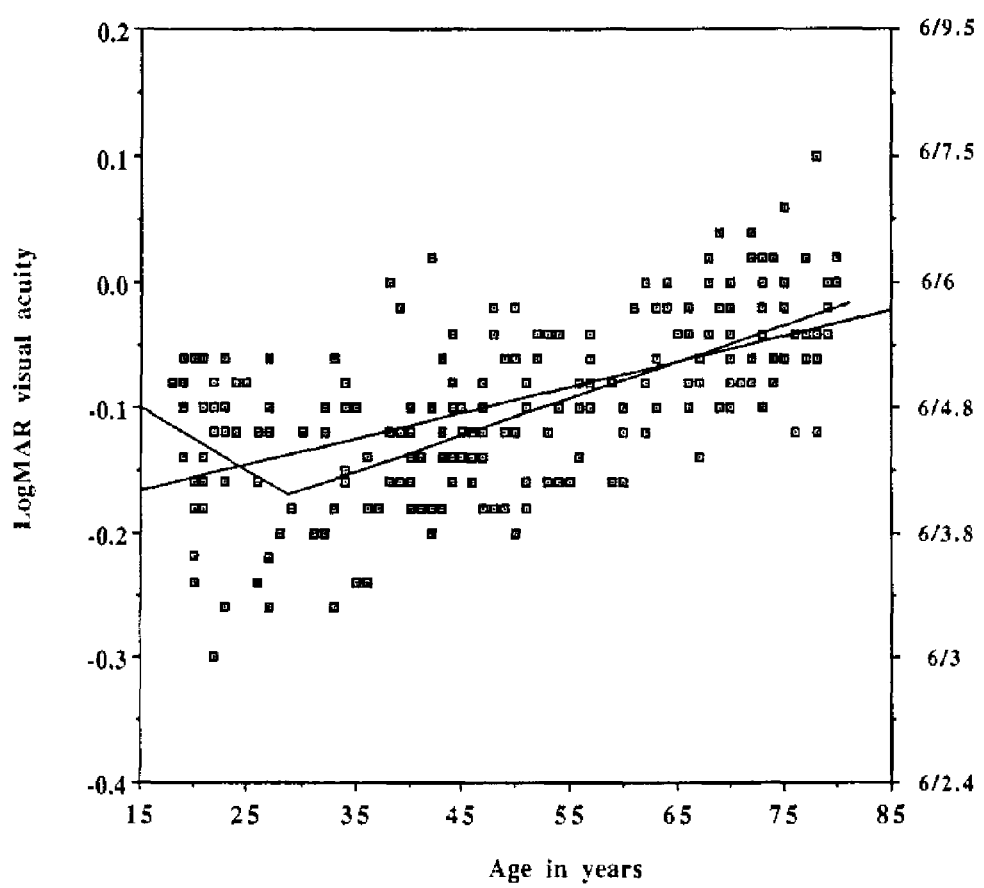
FIG. 2 is a graph showing population averages of visual acuity versus age for normal healthy eyes.
Figure 3:
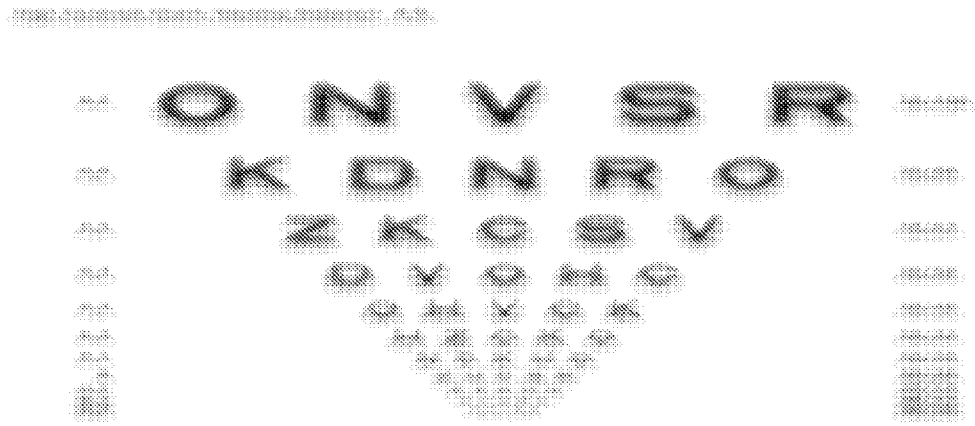
FIG. 3 is a high contrast eye chart optical simulation for a subject with 0.19 microns RMS of coma in a 6.0 mm pupil.
Figure 4:
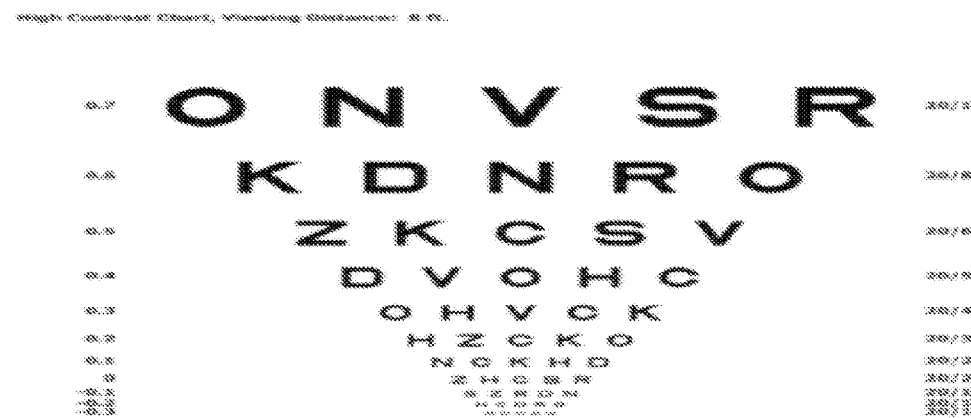
FIG. 4 is an optical simulation of an eye chart for a subject with a 6.0 mm pupil with no aberrations.
Figure 5:
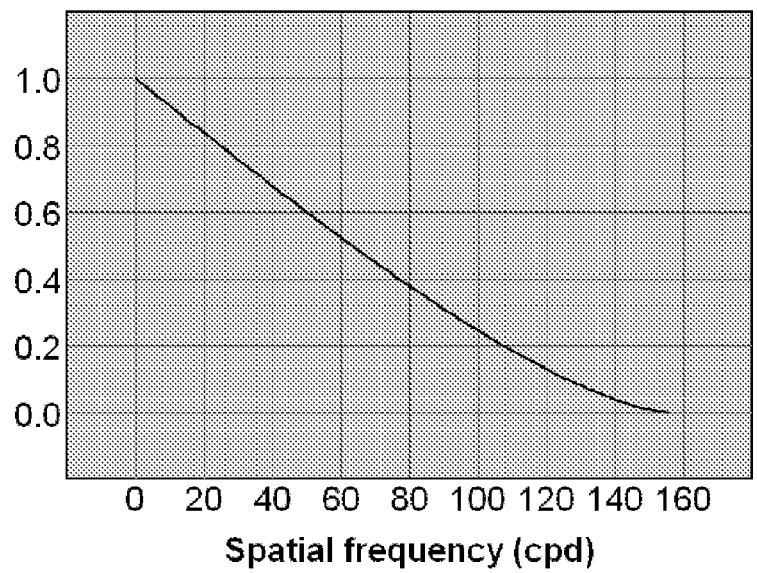
FIG. 5 is a graph showing the MTF of a subject with a 6.0 mm pupil with no aberrations.
Figure 6:
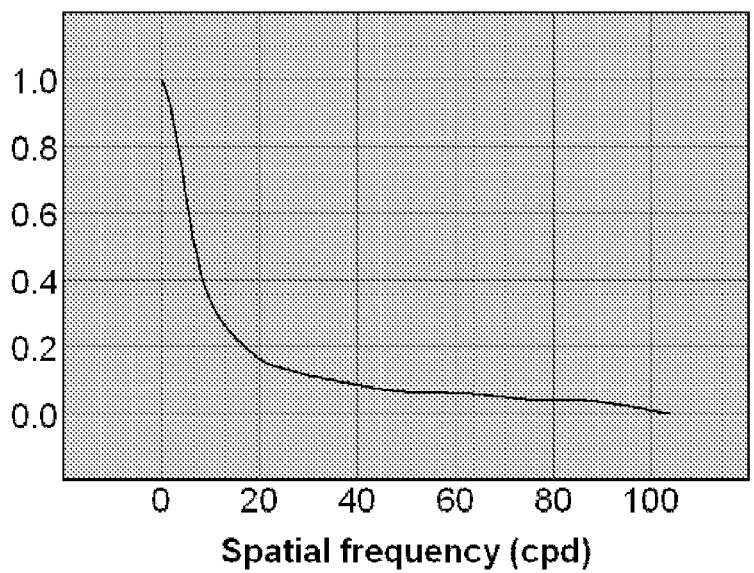
FIG. 6 is a graph showing the MTF of a subject with a 6.0 mm pupil with 0.19 microns of coma.
Figure 7:
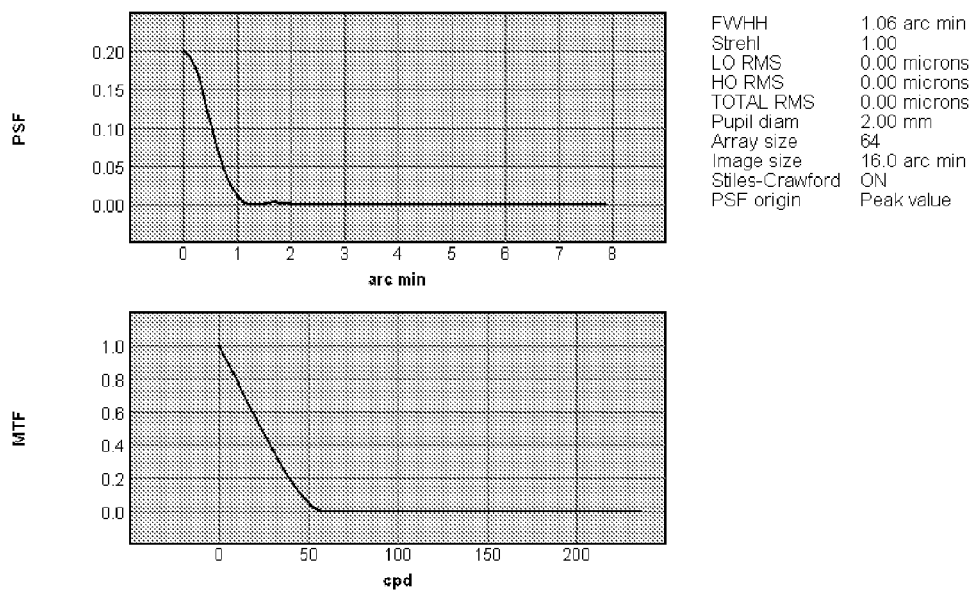
FIG. 7-FIG. 11 show various PSF and MTF graphs made with Visual Optics Lab VOL-CT software, version 6.89.
Figure 8:
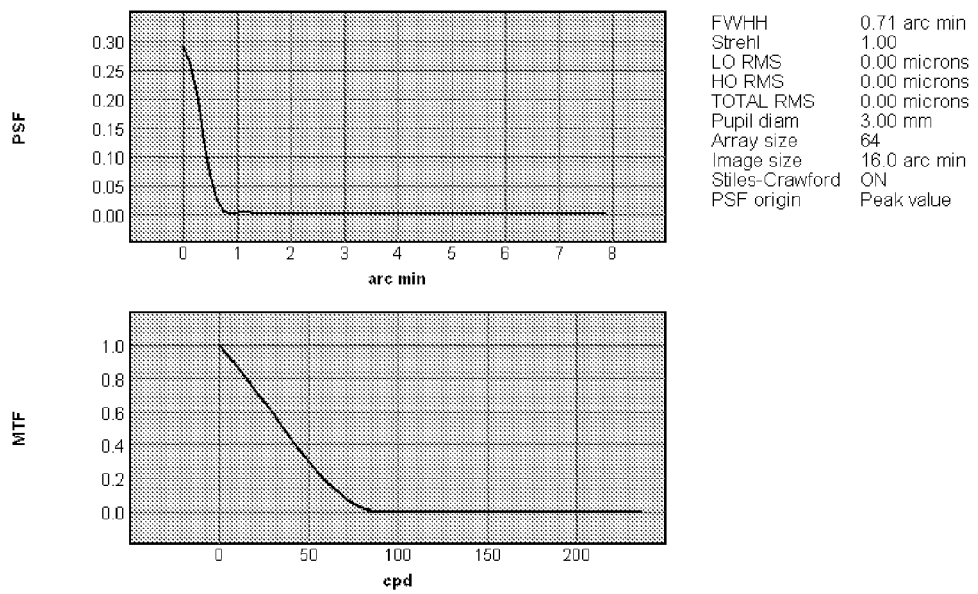

Currently, aggressive high-order aberration correction can only be implemented over a restricted field-of-view. Therefore devices that naturally operate with a restricted field-of-view are ideal candidates for this type of optical correction. Another category where high-order aberration optimization is expected to be of major benefit involves low light conditions where the pupil size is significantly increased. Optical aberrations generally increase dramatically with pupil diameter and can therefore have a larger impact on vision. Four modes of high-order wavefront correction in devices are included in the present invention. They are the following:
Binoculars
Rifle Scopes
Night Vision Devices
Laser Eye Protection Spectacles/Goggles The first three naturally employ a restricted field-of-view. The last two modes intrinsically involve reduced levels of light entering the eye, forcing increased pupil sizes in all conditions. The first two modes are often employed in low light conditions where pupil size is increased.

The high-order aberrations of a subject are measured using a wavefront sensor such as the Z-View® wavefront aberrometer (Ophthonix, Inc. San Diego). A high-order aberration correction element is then manufactured employing well known technology and incorporated into the device of interest as a removable element. This aberration correction element will in addition to correcting and optimizing high-order aberrations of the user's eye, also correct residual high-order error in the device itself. See, for example, U.S. Pat. Nos. 6,813,082; 6,989,938; 6,682,195; 6,712,466; 6,840,619; 6,942,339; 7,021,764; 6,781,681; 7,034,949; 6,761,454; 6,836,371; 6,934,088 and 6,976,641, each of which is hereby incorporated herein by reference in its entirety.

Optimal High-Order Aberrations

Characterizing the quality of vision is a complicated task because there are multiple independent aspects and numerous metrics of vision. However, two classes of metrics that are widely used are acuity and contrast sensitivity. If the human eye is made diffraction limited (meaning that all aberrations are erased) for a large pupil diameter such as 5 mm, both contrast sensitivity and acuity will be degraded to non-optimal values compared to what is possible. To better understand why this is so, and to envision what is necessary for optimal vision, the situation from both viewpoints will be examined.

Contrast Sensitivity

Contrast sensitivity involves the detection of sinusoidal gratings. In order to correctly identify the direction and frequency of a grating imaged onto a detector such as the retina, the Nyquist criterion is to have a minimum of two detection elements (e.g. foveal cones) per wavelength. The spacing of the cones in the fovea is of the order of 2.5 microns, corresponding to roughly 30 arc-seconds. This leads to an often quoted maximum resolution of about 60 cycles per degree (cpd) corresponding to 20/10 Snellen acuity.[14]

It is possible, using the interference of two laser beams, to produce sinusoidal gratings of any desired wavelength on the retina, bypassing the optics of the eye. When this is done, subjects correctly identify the wavelength and orientation of gratings below 60 cpd. However, when shorter wavelengths are produced on the retina, a pattern is still seen by the subject, but the wavelength and orientation reported are incorrect. When gratings above the Nyquist limit are caused to move, they are perceived to move in the wrong direction. What happens is that the optical power above 60 cpd is aliased to spatial frequencies below 60 cpd, and therefore constitutes noise.[15] Allowing spatial frequencies above the Nyquist limit to activate the retina is counterproductive and hinders correct recognition of a scene, although it still contributes to raw detection indicating that something is there. A distinction is made between detection acuity and resolution acuity. Detection acuity is the ability to tell if something is there, or if something has changed. It is resolution acuity that allows personnel to correctly recognize and identify objects and determine their direction of motion. A pilot with good detection acuity but poor resolution acuity might well be able to see another plane in the air at great distance, but he would incorrectly conclude that the plane was closer by and misjudge its direction of motion due to retinal aliasing to lower spatial frequencies. It is resolution acuity that should be maximized in order to optimize military function.

Exactly the same phenomenon occurs in digital cameras. If the optics of the camera lens is too good, aliasing causes degradation of the image when photographing scenes containing high enough spatial frequencies. This is typically remedied with the use of anti-aliasing filters.

The modulation transfer function or MTF is a measure of the amount of contrast transferred from the object to the image by an optical system. It is typically specified as a function versus spatial frequency. It is a measure of the quality of the optics. Higher MTF is generally a good thing, unless the spatial frequency is above the Nyquist limit for the detecting element. From the standpoint of MTF, the optimum thing to do is to maximize MTF below Nyquist, and minimize it above Nyquist. Once again, for the human eye, Nyquist is roughly 60 cpd. MTF for a diffraction limited eye with pupil diameter ranging from 2 mm to 8 mm is plotted in FIGS. 7-11. Above 3 mm diameter, the MTF above 60 cpd begins to rapidly increase. The point being that one doesn't want a diffraction limited eye with a pupil diameter bigger than about 3 mm. Therefore, the aberration structure beyond the central 3 mm diameter should be such as to maximize MTF below Nyquist, while minimizing it above Nyquist. This is accomplished by having the correct amounts of symmetric high-order aberrations.

Acuity

One may imagine that the situation for acuity is different. If one is trying to resolve a crisp edge on a high contrast object, how can better optics hurt? The point spread function or PSF is the distribution of light on the retina when looking at a point source of light such as a star. The PSF diameter or full width at half maximum (FWHM) becomes smaller as the pupil size becomes larger if there are no optical aberrations. Should it matter if the PSF becomes smaller than a single cone photoreceptor?

The fallacy in this thinking originates from failing to appreciate how the brain perceives location using the retinal information. It is well known that humans can routinely detect location to sub-foveal-cone accuracy. In vernier-acuity tests, typically people can align three points to less than 2 arc-seconds. A foveal cone photoreceptor has a diameter equivalent to 35 arc-seconds. What happens is that the PSF overlaps several cones simultaneously, and the brain interpolates position to sub-cone accuracy.[16] Were the PSF to become so narrow that only a single cone is illuminated at a time, the possible accuracy would decrease to 35 arc-seconds or one cone diameter.

Vernier acuity is very important for vision. It allows the brain to gauge distance very accurately by noting the slightly different positions of an image upon the retinas of the two eyes.

From the standpoint of acuity, the best thing to do is to make a PSF that has a diameter encompassing several cone photoreceptors, preferably three. A symmetrical PSF is better than an unsymmetrical one, so optimally all azimuthally non-symmetric aberrations should be corrected and eliminated. The diameter of a cone photoreceptor is roughly 30 arc-seconds or about a half arc-minute. The FWHM of the PSF for a diffraction-limited eye with pupil diameter ranging from 2 mm to 8 mm is listed in the data column next to the plots in FIGS. 7-11. The diameter of the PSF reduces as the diameter of the diffraction limited pupil increases. It can be seen that the multi-cone overlap criterion begins to fail for diffraction-limited pupils larger than about 3 mm diameter.

MTF & PSF Calculation Versus Pupil Diameter

The calculations displayed in FIGS. 7-11 were made using Visual Optics Lab VOL-CT software, version 6.89 (See ref. 17). They show that the MTF above 60 cpd, which is approximately the Nyquist resolution limit of the human fovea, increases when the pupil diameter increases beyond 3 mm diameter when no aberrations are present. Simultaneously, the PSF diameter decreases so that it no longer overlaps several cones. Foveal cone diameter is approximately 0.5 arc minutes.

Examples of Eyes with Excellent Vision

A clinical trial subject's right eye (Subject A) was measured at 20/12 acuity without glasses or contacts, which is close to as good as it gets for a young person. Subject A was 46 years old at the time, making his acuity all the more impressive. He claimed that he could hit a 1" target at 60 yards with a pellet gun using open sights, which he describes as "scary good." His high-order RMS on a 4.5 mm pupil was 0.66 microns, his low-order RMS was 0.98 microns, for a total of 1.2 microns, which did not sound very impressive. Even more puzzling at the time, it suggested that good acuity could come from an eye with significant amounts of aberration. When a fringe pattern was plotted of his total eye, however, it showed that the center 3 mm diameter of his wavefront was exceptionally flat, and at a larger radius the aberrations kicked in with a vengeance. See FIG. 12. This illustrates that the rule-of-thumb to correct only the center 3 mm for best vision actually works. In his case, high-order astigmatism and spherical aberration are compensated by sphere and astigmatism in the central 3 mm zone.

Subject "B" had 0.03 microns RMS of high order aberration in each of his eyes at 3.0 mm diameter, which is extraordinarily low. He could almost ace the entire low contrast sensitivity chart. Some of the tests patterns could not be seen by many people when it was placed directly in front of their face. The answer key had to be consulted to see whether he was giving the correct answers. Wavefront data on his eyes could only be obtained out to about 3.0 mm because he had small pupils. His eyes illustrate that superb contrast sensitivity is possible with perfect 3 mm pupils. Larger pupils are not required for extraordinary contrast sensitivity.

In a recent experiment using adaptive optics, the vision of three subjects was fully corrected over a 3 mm diameter pupil, and then over a 5.8 mm diameter pupil.[18] The Nyquist resolution limit for the human fovea is predicted to be about 20/10 and the world record previously measured was 20/8. Acuity with the 3 mm correction was measured at 20/7 in all three subjects, essentially matching the world record. However, vision did not further improve with the 5.8 mm correction. The details provided in the abstract did not indicate whether visual performance actually degraded with the 5.8 mm correction. These results confirm the predictions of the Nyquist resolution limit and are consistent with the idea that MTF above the resolution limit is not useful for resolution acuity.

The optimal optical correction for the human eye is not to simply correct every aberration for a large pupil diameter. This is difficult for many people to grasp initially. They have trouble believing that better optics can sometimes degrade vision. The explanation lies in the structure of the retina, not the optics.

To optimize vision for pupil diameters of 3 mm diameter or less, the optimum thing to do is eliminate all aberrations. Perhaps surprisingly, for pupil diameters larger than 3 mm diameter the situation is different. For pupils larger than 3 mm diameter, the optimum thing to do is to maximize MTF below Nyquist, and minimize it above Nyquist. Alternatively, the PSF should be made symmetrical and of such a diameter that it overlaps approximately 3 photoreceptor cones in the fovea.

Implementation of High-Order Correction

Implementation of high-order correction in a practical manner is currently under development. Attempts to correct high-order using invasive procedures such as corneal surgery, and intraocular implants have been stymied by uncertainties and variations in the aberrations generated by the surgical and healing processes.[19] Corneal laser surgery has a long history of making high-order aberrations levels considerably worse. Using a wavefront aberrometer it is easy to identify a LASIK or RK subject, because their high-order levels are considerably elevated above the norm. A few subjects get lucky, but the majority suffers from reduced contrast sensitivity due to the increase in high-order aberrations caused by the surgery. The recent introduction of wavefront based correction techniques has brought the hope that perhaps laser/cornea surgery can avoid making the high-order levels worse on average. Contacts are another possibility, but a major issue involves stabilizing the position and rotation of the contact in the optimum position. The contact itself changes the aberrations of the eye and this has to be reliably predicted and taken into account. High-order correction with contacts has yet to be demonstrated. Clinical trials have demonstrated improved visual performance with high order correction in spectacle lenses.[20]

Before high-order aberrations can be corrected and optimized, low-order aberrations must be corrected. Due to difficulties in accurately refracting subjects, the optimum low-order prescription is not always obtained. The Z-View® wavefront aberrometer (commercially available from Ophthonix, Inc., San Diego) quickly and accurately refracts the human eye, and determines the optimum low-order prescription. It accomplishes this without the subjective input of the subject, and reduces the chance of human error. In addition, it provides a complete analysis of high-order aberrations. Wavefront guided lens technology then allows for the correction of high-order aberrations in spectacles and other devices. See for example U.S. Pat. Nos. 6,813,082; 6,989,938; 6,712,466; 6,840,619; 6,942,339; 7,021,764; and US Patent Publication 2006/0052547 all of which are incorporated herein by reference.

Adaptation

Vision involves three main factors; the optics of the eye, the retina and the brain. The optics determines the MTF and PSF. The retinal structure imposes constraints on the PSF and MTF, which the optics must provide for optimum vision. Finally, what a person actually sees is something computed by the brain, based upon the information from the eye. Due to aberrations in the eye, images of straight lines on the retina are in fact distorted and blurry. However, we nevertheless see straight lines and we do not notice the blurriness.[21] This is due to processing in the brain.

In a fascinating experiment involving adaptive optics, subjects had their aberrations erased and then recreated in a rotated form.[22] What is interesting is that the subjects suffered from significantly decreased acuity and contrast with the rotated aberrations. After a half-hour of viewing with the new optical situation, a large portion of the vision loss disappeared. The conclusion is that the brain adapts to the aberrations present in the eye, and this adaptation improves visual ability. However, it takes time to adapt to a new aberration configuration. It is not known how long of an adaptation period is required for maximum benefit to be realized. However, in many situations three days has been shown to be sufficient. For instance when goggles are worn that flip the images of the world upside down, three days later the person is able to function in a completely normal fashion, signing checks and shaking hands etc.[23] When the goggles are then removed, normal function is retained because the brain still has the previously used software, however there is an eerie sensation for an hour or so. A small scotoma generated by laser damage will continue to obscure a portion of the visual field, but will not be continuously noticeable by the subject several days later. These and other examples suggest that several days are sufficient to allow for significant levels of adaptation.

The result is that when high-order aberration correction is implemented, personnel should not expect to experience the maximum visual benefit instantaneously. Rather a few days of adaptation should be allowed to allow the brain to learn to use the new situation in the optimal fashion.

Figures 12, 13:
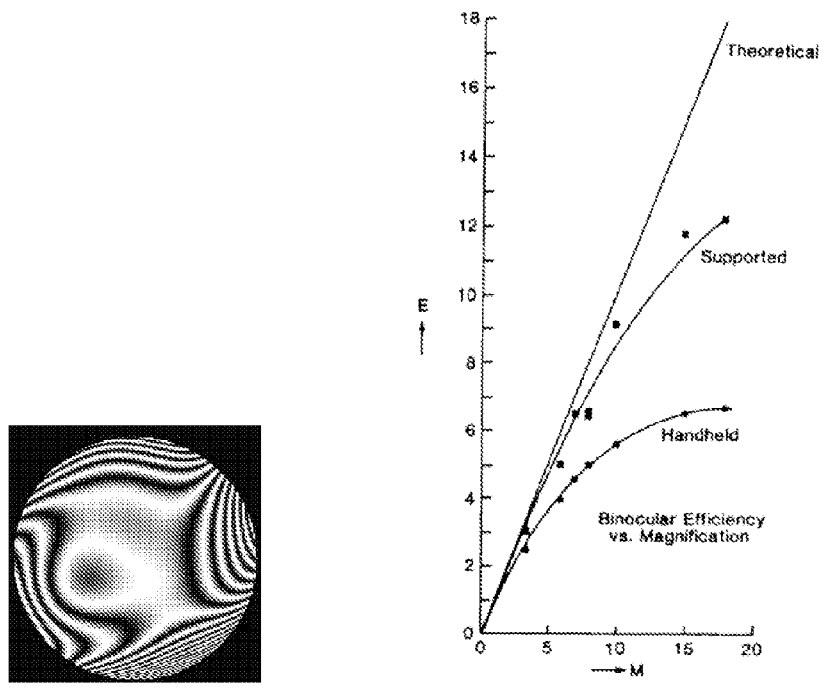
FIG. 12 is a total aberration fringe pattern (OD).
FIG. 13 is a graph showing binocular efficiency versus magnification.

Application of High Order Correction to Military and Sporting Devices Binoculars Binoculars represent a highly evolved optical device with a long history of development.[24] In essence binoculars are two telescopes set side by side to allow for binocular viewing of a magnified image.[25] Since a binocular extends the range of human vision, one figure of merit for binocular performance is the maximum range at which a target can be detected using the binocular. Binocular efficiency is defined[26] as $$E = \frac{R}{r}$$

where E is the binocular efficiency, R is the range at which the target is detected with the binocular, and r is the range at which the target is detected with the unaided eye. Experiments show that the binocular efficiency decreases from ideal values as magnification is increased[27], more so for hand held binoculars as shown in FIG. 13.

For the hand-held case, simple models indicate that the drop off with increasing magnification is mostly due to tremble or shake induced by the user. A smaller portion of the efficiency loss is due to optical imperfections in the optics of the binoculars which increases with lens power and magnification. The probability of recognizing equal-sized images of objects in a given time is reduced, and the recognition time increases approximately proportionally to the increase in magnification.[28] Observation time is not unlimited. Experience with a large number of individuals using binoculars with 10× to 15× magnification for a prolonged period of time using complete focused attention has shown that the maximum possible observation period amounts to 2-3 min on the average.[29] Research has also demonstrated that low-contrast detection tasks are far more sensitive measures of binocular performance than high-contrast bar charts.[30]

The equation defining binocular efficiency can be recast as:

$$R = E \cdot r$$

In order to increase the range R at which an object could be detected, one can either increase the binocular efficiency E, the range r at which the object can be detected without the binoculars, or both. By correcting aberrations in the binocular optics, small improvements in E may be possible. By correcting aberrations in the eyes of the user, significant improvements in r should be possible, especially in low light conditions where the pupil diameter is increased. Both corrections can be done simultaneously in a single aberration correcting optical element.

Ideally the high-order aberration correcting element based on aberrations measured at the position of the cornea would be positioned at a location in the optical system conjugate to the cornea. The light exiting the eyepiece of a telescope or binocular is approximately collimated, and therefore the phase plate could be made to fasten externally onto the eyepiece. Corrections due to the finite distance from the cornea can be calculated and incorporated into the design. However, these corrections are likely to be small. High-order correction has been shown to be relatively insensitive to axial position (distance from the eye). In a study involving phase plate correction of three human subjects, two of the three subjects maintained 95% correction when the phase plate was moved 5 pupil radii away from the optimum position.[31] The third and worst case had the degree of compensation reduced to 85%, which is nevertheless a very respectable correction level. What this means is that high-order correction in optical devices like telescopes and binoculars is easy to test, because it is not necessary to "hack" into the optical device, one simply needs to affix a phase plate to the eyepiece. It also means that although the optical correction is personalized, the optical device itself is not. It can be used by any personnel. Anyone who has a personalized corrector plate manufactured for their eye can use the device in an enhanced mode with super normal vision capability. Testing of the concept is straightforward. Placebo phase plates with no correction and high-order correcting phase plates are affixed to the eyepieces in a double-masked study and the vision testing results compared.

Rifle Scopes

A typical task in a rifle scope is to line up a reticule with an object in the background. Optimization of this task requires optimization of vernier acuity. In its simplest form, vernier acuity involves the judgment of when two lines are aligned. Foveal cones in the human eye are separated by roughly 35 arc seconds, so that one might naively assume that the best possible alignment is to within about 35 arc-seconds. However, humans can routinely align such lines to better than 2 arc seconds.[32] This is possible only because the width of image of the line on the retina is wide enough to encompass several cones, and the brain learns to interpolate position to sub-cone-spacing accuracy.

High-order aberrations can distort the shape of the line on the retina, lower contrast to make the line more difficult to detect, and excessively broaden the width of the line, leading to reduced vernier acuity. However, if one were to correct all optical aberrations over say a 5 mm diameter pupil typical in dim lighting, the width of the image of a narrow line on the retina would be less than the width of a single cone. In this case, vernier acuity would actually deteriorate to 35 arc seconds, because interpolation would be impossible. This example illustrates that naively correcting all high-order aberrations over a large pupil (larger than 3 mm diameter) is actually counter productive. It also demonstrates that there are two completely different ways to suffer reduced vernier acuity, too many high-order aberrations in a small pupil, or too few aberrations or more correctly a non-optimal high-order aberration structure in a large pupil. For this reason, it is perhaps more appropriate to refer to high-order aberration "optimization," rather than simply "correction."

The ultimate test is to have a double masked study using experienced marksmen, using either plano optical elements containing no correction or with personalized high-order corrector elements attached to their scopes. The study would look for statistically significant tighter grouping of the bullet holes in the targets with the use of high-order correction. Before this test, however, simple increases in contrast sensitivity and acuity with the use of high-order correction will be looked for.

Night Vision Devices

Military, police and sporting activities frequently take place in low light conditions such as at night and the use of night vision devices (NVDs) and night vision goggles (NVGs) in particular is now commonplace. The resolution of NVGs is primarily limited by the image intensifier tube (IIT), is of the order of 30 line pairs per millimeter out of the IIT, and results in a visual acuity limitation of approximately 20/40. There are two separate areas where a programmable wavefront optic might improve visual function with an NVG:

Minimizing alias noise generated at the photocathode by controlling MTF on the objective side
  Optimizing the high-order aberrations of the user who typically has dilated pupils due to the lower light levels, and controlling MTF on the eyepiece side Objective Side—The image intensifier tube (IIT) has a limiting resolution at something like 30 line pairs per mm. Any component of the light transmitted by the objective that has spatial frequency content in excess of the spatial frequency limit will be detected by the image intensifier tube but will be aliased to a lower spatial frequency and end up as noise. Ideally the modulation transfer function or MTF for the objective would be as large as possible below the spatial frequency limit, but as small as possible above the limit. However, in order to be very successful at this, the optical designer would need access to a variable amount of very specific azimuthally symmetric aberration that could be introduced to the objective. Other issues often dominate the selection of the lenses used, which invariably are commercial off the shelf optics. However, using wavefront programmable lens technology described herein, the optimal high-order aberration could be easily manufactured. This corrector plate will improve contrast sensitivity by minimizing a major source of noise.

Eyepiece Side—Because the image intensifier tube is limited in spatial resolution, any MTF in the eyepiece optics above the spatial frequency limit can only deliver noise to the eye. MTF above the spatial frequency limit can be minimized by controlling the azimuthally symmetric aberrations of the eyepiece optics. A corrector plate for the eyepiece side can be made which controls the MTF in the desired fashion. The corrector plate can also optimize the high-order aberrations specific to the user's eye. The aberrations of the user would be measured using a wavefront aberrometer. The pupil diameter can be estimated from the scene luminance presented to the eye. This is typically 2-4.5 cd/m$^2$ resulting in an average pupil diameter larger than 5 mm for young adults.[33] Even with the image intensifier, light levels presented to the eye are far below daytime levels, and the pupil diameter is significantly increased. Levels of high-order aberrations dramatically increase with pupil diameter, and affect contrast sensitivity. With optimization of the user's high-order aberrations, contrast sensitivity will be optimized.

With the above enhancements there may be a slight increase in acuity through the system, but due to the limitation of the IIT this may be small. However, acuity is but one measure of vision, and it does not fully describe visual function. Contrast sensitivity is a better measure of visual function. Two personnel with identical acuity can have very different contrast sensitivity curves. The person with better contrast sensitivity will see better, and recognize and react faster. Acuity is a measure of the contrast sensitivity only at the highest detectable spatial frequency. The significant contrast improvement and noise reduction anticipated with high-order correction of NVGs should result in better visual function, and faster recognition and reaction times. NVGs can be tested in a double masked study both with and without the optimum personalized correction optics. Placebo correction plates with no optical power would be used for the null case.

Laser Eye Protection Spectacles/Goggles

With evolving technology, lasers very dangerous to the human eye have become more affordable and widespread. Mass produced lasers packaged in the form of laser pointers are approaching the class-IV laser safety designation (>0.5 watt average power), meaning that they can fairly easily start fires.[34] The result is that the use of lasers that are not eye safe is almost certain in modern warfare. And it is not just the enemy that US personnel must be concerned with. The US military itself utilizes numerous dangerous lasers, and numerous accidents have been documented.[35] Recently commercial airline pilots have reported laser beams aimed at in-flight commercial airlines. The result is that all deployed personnel may occasionally be required to wear laser eye protection (LEP) goggles or spectacles. A disadvantage of LEP is that in order to protect against most major threat wavelengths, a substantial proportion of the available light must be blocked. The laser eye protection devices therefore often resemble dark sunglasses. In low light conditions such LEP devices severely degrade vision. Any enhancement to vision that can be obtained while wearing LEP devices is thus in great demand.

In reduced lighting the pupil diameter increases and high-order aberrations levels dramatically increase. This is precisely the condition where high-order aberration optimization and correction will provide the maximum possible benefit. In addition to high-order monochromatic aberrations, there are also severe chromatic aberrations in the human eye. Simultaneous correction of high-order aberrations and chromatic aberrations will have a synergistic effect, because these two categories of aberrations compensate each other to a degree. Therefore, if chromatic aberrations are corrected in addition to monochromatic high-order aberrations, the visual improvement will roughly double.[36]

Chromatic aberration correction in the case of LEP would come from spectral narrowing due to the filtering. The pass band of LEP devices is an evolving entity as laser technology itself evolves. However, some general principles can be leveraged. Lasers generating near-infrared and red wavelengths are more economical per watt, and generally more compact and lightweight than shorter wavelength lasers, so consequently LEP devices tend to block the near-IR and red end of the spectrum. The peak photopic sensitivity is in the green, so the broadest protection while passing maximum luminosity is perhaps to block both the red and blue ends of the spectrum. However, the availability of frequency doubled lasers operating at 532 nm may require blocking at that specific green wavelength as well. The net effect of LEP filtering is to generally narrow the spectral range entering the human eye. This reduces the amount of light entering the eye which generally reduces visual ability, and that is the problem. However, it also effectively reduces chromatic aberration, which if combined with high-order aberration correction will lead to improved visual function, and this is the opportunity.

Figure 14:
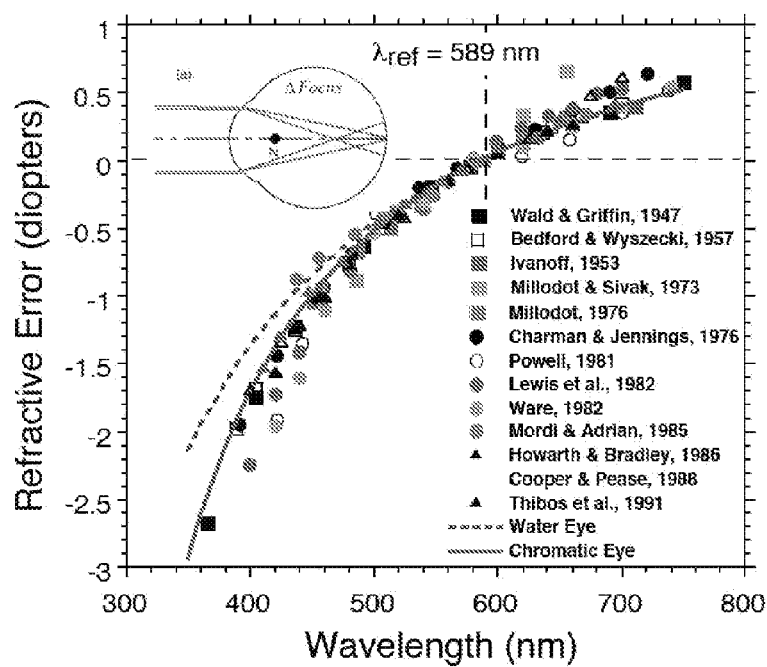
FIG. 14 is a graph showing the longitudinal chromatic aberration of the human eye.

The longitudinal chromatic aberration of the human eye[37] is shown in FIG. 14.

Between deep blue and deep red there is a 2.5 diopter difference, which is enormous. What this means is that if one is focused perfectly for deep blue, the deep red is 2.5 diopters out of focus. Several factors mitigate the severity of this aberration. Primarily the photopic response curve shows that the eye is much more sensitive to green light than blue or red. Also, monochromatic high-order aberrations increase the depth of focus of the eye and thereby combat chromatic aberration as well.[38] Correction of chromatic aberration by itself through spectral narrowing does not enhance acuity or contrast to a large degree, probably due to the interaction with monochromatic aberrations. But correction of both chromatic and monochromatic aberrations will lead to a dramatic improvement in contrast and improvement in acuity.[39] The spectral narrowing inherent in laser eye protection creates an ideal situation for high-order aberration correction to make a substantial improvement in visual ability.

Generic LEP devices resembling spectacles or goggles differ from the other applications described herein in that the devices are not intrinsically limiting to the field of view. Spectacles are generally designed to minimally restrict the field of view. Therefore, since an aggressive high-order correction zone would itself have a limited field of view, the high-order zone would represent a vision "sweet spot" in the LEP device. The situation is analogous to that of progressive addition lenses (PALs) worn by subjects over the age of approximately 45 to combat presbyopia, or the inability to focus nearby. The near zone and the addition channel in particular have a restricted field of view. Head motion is required to align the near zone or the addition channel with the object of interest and this requires a few days of adaptation. Yet virtually all subjects can adapt to PALs, and PALs represent more than half of all dispensed multi-focal lenses proving that a solution with a restricted field of view is acceptable.[40] What happens in the case of PALs is that the brain learns to disregard the transition zones around the power channel and one only notices the beneficial power increase. The eyes and head learn to move so as to reap optimum benefit from the power channel.

In the case of high-order correction, the corrected field-of-view depends upon the spatial frequency content of the correction, and is larger for lower spatial frequency content. High-order correction can be implemented so as to increase the field-of-view at the cost of some of the correction.[41] Coma is the high-order aberration containing the lowest spatial frequency content. As such, it is the high-order aberration that is easiest to correct while maintaining the largest possible field-of-view. There are tradeoffs to be made between field-of-view and degree of high-order optimization and correction.

In summary, LEP typically reduces chromatic aberration due to spectral filtering. In such cases the vision benefit due to correction and optimization of high-order aberrations will roughly double. In a spectacle or goggle format, aggressive high-order aberration correction will create a vision sweet spot that the user would have to adapt to and learn to use. The addition of high-order aberration correction significantly improves contrast sensitivity and acuity after a suitable adaptation period.

Wavefront Aberrometer

Refracting subjects is time consuming, sometimes difficult and often inaccurate. A preferred wavefront sensor used in the practice of the present invention is a self-imaging diffractive aberrometer such as for example the Z-View® aberrometer that can quickly and accurately refract subjects, literally in the blink of an eye. Wavefront aberrations including high-order aberrations are automatically recorded. This fingerprint of the eye contains complete information concerning the optical quality of the eye. The novel design of the Z-View® aberrometer gives it just as much accuracy but higher spatial resolution than aberrometers based upon Hartmann-Shack sensors which are also commercially available and can also be used in taking wavefront measurements according to the present invention.

Figure 15:
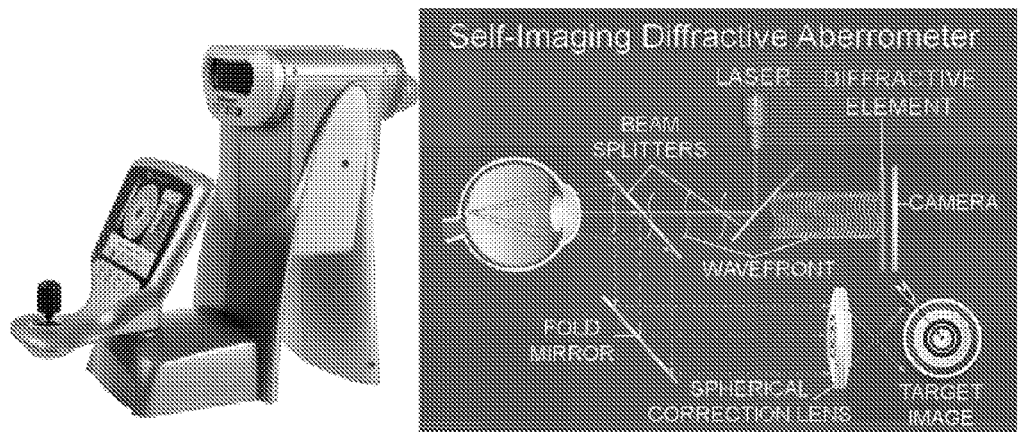
FIG. 15 is a diagram showing the operation of a diffractive wave front sensor that employs the self-imaging Talbot effect.

FIG. 15 is a flow diagram showing the functions of a self-imaging diffractive aberrometer which is based on a principle of wave optics called "self-imaging" or the Talbot Effect.[43] The Talbot Effect is based on the fact that when certain intensity modulation patterns are placed at the optical pupil of a system and illuminated with plane waves, images reappear at predicable positions along the propagation path (Talbot Planes). Additional optical elements are not required to form these images. A subset of the modulation patterns that self-image include all periodic structures such as two-dimensional sinusoidal gratings. The modulation pattern can be recorded by an imaging detector placed at the position of one of the Talbot Planes. If the optical system contains wavefront aberrations, the image of the modulation pattern will be distorted relative to the periodic modulation element. The distortions on the periodic "carrier" intensity pattern can be extracted through computer algorithms applied to the recorded intensity values. The computer algorithms are based on Fourier transformation of the measured intensity, and subsequent extraction of the aberration information from the carrier signal. The diffractive sensor is described in more detail elsewhere.[44]

A typical Hartmann-Shack system utilizes 50-200 measurement points within a 7 mm diameter pupil, and even the latest "high resolution" systems use approximately 3,500 points.[45] If the curvature of the wavefront varies significantly over a sub-aperture, either because the aberrations are of high spatial frequency, or because the aberrations are of low spatial frequency but large in magnitude, the result is that the focused spots in an HS sensor become blurry and more difficult to locate.[46] The self-imaging diffractive WFS utilizes a two-dimensional grating and has more than 17,000 effective elements over a 7 mm pupil. This higher spatial resolution makes it less likely to fail due to large wavefront curvature. However, both types of sensors experience difficulties if the spots or effective element images are displaced such that they overlap on the position sensitive detector. Due to the short distance between the grating and camera, 100 diopters of local power between elements is required to cause element overlap in the self-imaging diffractive sensor.

Photopolymer Spectacle Technology

Conventional spectacles offer cylinder, sphere and prism compensation for the eye's aberrations. iZon® spectacle lens technology includes a programmable optical layer, i.e., photopolymer layer, in which both high-order and low-order aberrations can be corrected, and in which diffractive elements can be "written" on demand.[47] The index of refraction can be varied in the photopolymer layer to produce a variable index of refraction profile that compensates for high order aberrations of the eye or inherent aberrations in the lens. Aberrations can eliminated or modified to produce the optimal visual content. Basically any imaginable optical design can be programmed in the lens to a very precise level. The principal high-order aberrations are coma, trefoil and spherical aberration. Coma, which is an aberration producing a comet-like tail on the point spread function or PSF, significantly reduces contrast sensitivity. Spherical aberration can directly affect the minimum retinal spot size and thus acuity. Therefore, high-order aberration optimization and correction can have very significant impact on vision. Using diffractive designs programmed into a photopolymer lens, prism could be produced in a thinner, lighter spectacle. Diffractive elements can also remove chromatic aberration due to conventional prisms and large prescriptions, and markedly increase the depth of focus.[48] By programming optical patterns tailored to the individual subject, a subject's retinal image can be warped around dysfunctional retinal tissue, thereby eliminating a substantial blind spot.[49] By combining free-form surface generators with the programmable photopolymer layer, virtually any imaginable optical element can be created.

iZon® photopolymer lenses are comprised of three layers. The outer layers are composed of a high-index ophthalmic polymer. The central layer is a thin programmable polymeric layer in which the index of refraction can be altered.[50] This refractive index alteration is programmable with the application of ultraviolet light, and virtually any conceivable pattern can be generated. There are dynamic range limitations, and typically the gradient index pattern written into the polymeric layer is combined with surface profile generation on one or more of the outer layers to produce the desired optical design. The gradient index layer can be fixed to make it immune to further UV exposure. The spectacle lenses may then be exposed to direct sunlight without degradation of the optical profile.

Figure 16:
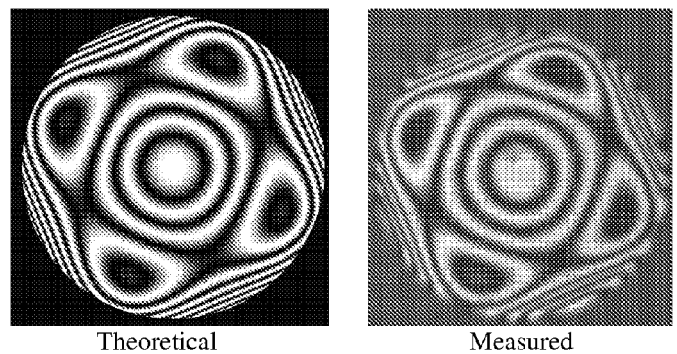
FIG. 16-FIG. 18 show theoretical and actual fringe patterns based on a programmed high order lens.
Figure 17:
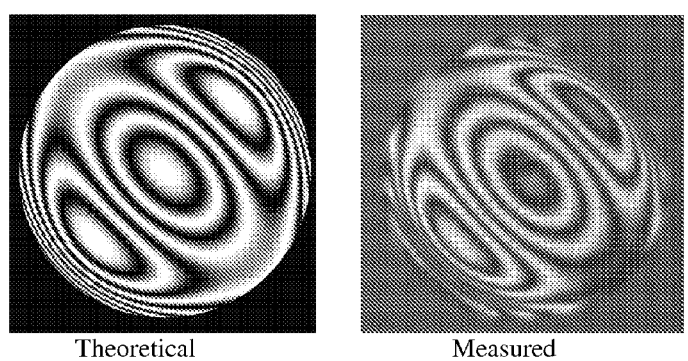
Figure 18:
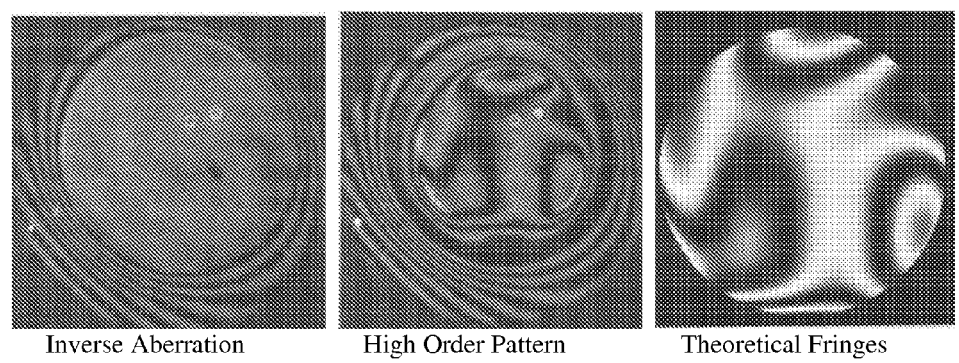

Laser-based direct digital lens writers are employed to program a desired pattern into the polymeric layer. Either bitmaps or Zernike values can be used to specify a written pattern. FIGS. 16 and 17 demonstrate specific Zernike patterns 6 mm in diameter, programmed into photopolymer lenses. FIG. 16 shows the theoretical and actual fringes written in a photopolymer lens; $0.20 \mu m\ Z_{4,-4}+0.29 \mu m\ Z_{4,0}$ while FIG. 17 shows theoretical and actual fringes written in a photopoymer lens; $0.21 \mu m\ Z_{4,-2}+0.29 \mu m\ Z_{4,0}$ Theoretical fringe patterns are shown as well as the actual fringe pattern recorded using a Zygo interferometer. In FIG. 18, the $2^{nd}$-order aberrations in a lens blank have first been erased in a circle 8 mm in diameter, illustrating that aberrations introduced during conventional manufacturing processes can be corrected. Then a correction for the eye aberrations of a subject have been written in the zone, illustrating that high-order aberration correction is achieved with this technology. Comparison with the theoretical fringe pattern shows excellent agreement.

Public Purpose

The present invention is directed toward improving human vision when using specific devices frequently used in the military. However, many of the same or similar devices are used by the general public. Hunters use rifle scopes and would benefit from enhanced vision in the morning or evening when light levels are low. Persons with low vision often use small telescopes to see distant objects such as road signs. Since most of these persons use eccentric viewing, their levels of high-order coma are significantly elevated, and they may benefit greatly from high-order aberration correction and optimization. Many people use binoculars in various situations, including bird watchers, rangers, hunters and wildlife enthusiasts, and many would benefit from improved vision when using the devices. The technology described here is applicable to microscopes and telescopes. For instance, astronomers and pathologists may prefer to have personalized eyepieces that allow them to see more clearly through their devices. With decreased recognition times associated with improved levels of contrast sensitivity, productivity may be expected to increase. With increases in acuity, more information will become available when using the devices. If the LEP application with its chromatic correction indeed produces a doubled vision benefit, an entirely new avenue of specialized vision optimization will be opened up. Spectral narrowing sunglasses with a super-normal-vision sweet spot will find use by many in the general public, as well as by people in other governmental agencies.

Exemplary Methods

Binoculars 30 subjects are recruited for a clinical trial. The high-order aberrations of study subjects are measured using the Z-View® wavefront aberrometer. The aberrations of the binoculars to be used in the study (typical military binoculars) are measured using an interferometer. High-order aberration correcting optical elements based upon the combined subject measurements and device measurements are made to be affixed to the eyepieces of the binoculars. If the device (binocular) optical errors are potentially significant, then high-order correcting optical elements based only upon the subject device measurements are made so as to later be able to estimate the contribution due to device optical errors. A placebo optical correcting element containing no high-order aberration correction is also made so neither test subjects nor medical personnel know which correcting elements are being used during the test. Using a double masked clinical trial, contrast sensitivity and low-contrast visual acuity using the binoculars under a range of documented lighting conditions with minimal time for adaptation are measured. Subjects completing the clinical trial will next be required to spend a minimum time of 8 hours accumulated over the next several weeks looking through the binoculars with high order aberration correction to provide time for adaptation. Accumulated time looking through the binoculars will be estimated and recorded. The double masked clinical trial is repeated (including placebo) measuring contrast sensitivity and low-contrast visual acuity using the binoculars under a range of documented lighting conditions. Binoculars providing high order correction will provide better vision.

Rifle Scopes 30 subjects are recruited for a clinical trial. These will be subjects that are at least minimally experienced at shooting a rifle using a scope. The high-order aberrations of study subjects are measured using the Z-View® wavefront aberrometer. The aberrations of the rifle scopes to be used in the study are measured using an interferometer. High-order aberration correcting optical elements based upon the combined subject measurements and device measurements are made to be affixed to the eyepiece end of the rifle scope. If the device (rifle scope) optical errors are potentially significant then high-order correcting optical elements based only upon the subject measurements are made so as to later be able to estimate the contribution due to device optical errors. A placebo optical correcting element containing no high-order aberration correction is also made so neither test subjects nor medical personnel know which correcting elements are being used during the test. Using a double masked clinical trial, contrast sensitivity, low-contrast visual acuity and vernier acuity using the rifle scopes under a range of documented lighting conditions with minimal time for adaptation are measured. Subjects completing the clinical trial will next be required to spend a minimum time of 8 hours accumulated over the next several weeks looking through the rifle scope with aberration correction to provide time for adaptation. Accumulated time looking through the scope will be recorded. The double masked clinical trial is repeated (including placebo) measuring contrast sensitivity, low-contrast visual acuity and vernier acuity using the rifle scopes under a range of documented lighting conditions. A clinical trial at a shooting range is then is then conducted with test subjects in the study group. Subjects using the rifle scopes with high order correction attachments will have better shooting scores.

Night Vision Goggles (NVGs)

30 subjects are recruited for a clinical trial. The high-order aberrations of study subjects are measured using the Z-View® wavefront aberrometer. The aberrations of the eyepieces and objective optics of the NVGs to be used in the study (a typical military NVG) are measured using an interferometer. High-order aberration optimizing optical elements based upon the combined subject measurements and device measurements for the eyepiece are made to be affixed to the eyepiece of the NVGS. High-order aberration optimizing optical elements based upon the device measurements for the objective end are also made to be affixed to the objective end of the NVGs. If the device optical errors on the eyepiece end or objective end are potentially significant, high-order correcting optical elements based only upon the subject measurements are also made so as to later be able to estimate the contribution due to device optical errors. A placebo optical correcting element containing no high-order aberration correction is also made for both ends so neither test subjects nor medical personnel know which correcting elements are being used during the test. Using a double masked clinical trial contrast sensitivity and low-contrast visual acuity using the NVGs under a range of documented lighting conditions with minimal time for adaptation are measured. Subjects completing the clinical trial will next be required to spend a minimum time of 8 hours accumulated over the next several weeks looking through the NVGs with aberration correction to provide time for adaptation. Accumulated time looking through the NVG will be estimated and recorded. The double masked clinical trial is repeated (including placebo) measuring contrast sensitivity and low-contrast visual acuity using the NVGs under a range of documented lighting conditions. NVGs containing high order aberration correction will provide better vision.

Laser Eye Protection (LEP)

30 subjects are recruited for a clinical trial. The high-order aberrations of study subjects are measured using the Z-View® wavefront aberrometer. An LEP device is selected to be used in the study which also has significant spectral narrowing. Spectral narrowing is measured using spectrometers and densitometers. A photopolymer programmable optical element is made having the same spectral transmission. There are two parallel approaches to be pursued. One is to manufacture programmable lenses using lens blanks obtained from the LEP manufacturer or to modify the actual finished LEP devices themselves. The simplest method is to obtain the raw dyed and/or coated lens blanks from the LEP manufacturer and apply a photopolymer coating having the high order correction programmed in the photopolymer layer. The photopolymer layer is then hard coated preferably using a vacuum coating facility. Alternatively, the actual LEP device is converted to a programmable lens through a thinning and lamination process. The other approach will be to mimic with sufficient accuracy the optical density versus wavelength property of the LEP in a photopolymer lens using dyes and coatings. Examples of dyes that are available include A-195 from Gentex Corporation and others available from Glendale Laser Eyewear and Specialty Filters. High-order aberration correcting optical elements based upon the combined subject measurements and device measurements are made. A placebo optical correcting element containing no high-order aberration correction is also made so neither test subjects nor medical personnel know which correcting elements are being used during the test. Using a double masked clinical trial, contrast sensitivity and low-contrast visual acuity using the LEP devices under a range of documented lighting conditions with minimal time for adaptation are measured. Subjects completing the clinical trial will next be required to spend a minimum time of 8 hours accumulated over the next several weeks looking through the LEP devices with high order aberration correction to provide time for adaptation. Accumulated time looking through the LEP devices will be estimated and recorded. The double masked clinical trial is repeated (including placebo) measuring contrast sensitivity and low-contrast visual acuity using the LEP devices under a range of documented lighting conditions. A questionnaire is filled out by the study participants concerning their impression of the usefulness of the vision "sweet spot" and their adaptation experience while using the vision sweet spot in the LEP device. The LEP devices providing high order aberration correction provide better vision.

REFERENCES CITED (1) Raymond Applegate, "Zernike Expansion," Wavefront Congress presentation, http://129.7.217.162/presentations.htm; David Atchison, "Recent advances in the representation of monochromatic aberrations of human eyes," Clin Exp Optom, Vol. 87, No. 3 (2004) pp. 138-148

(2) Barry Winn, David Whitaker, David B. Elliot, Nicholas J. Phillips, "Factors affecting light-adapted pupil size in normal human subjects," Invest. Ophthalmol. & Visual Sci, Vol 35, No. 3, (1994), pp. 1132-37

(3) RCA Electro-Optics Handbook, 2nd edition (1974 RCA Corporation), p. 70

Figure 9:
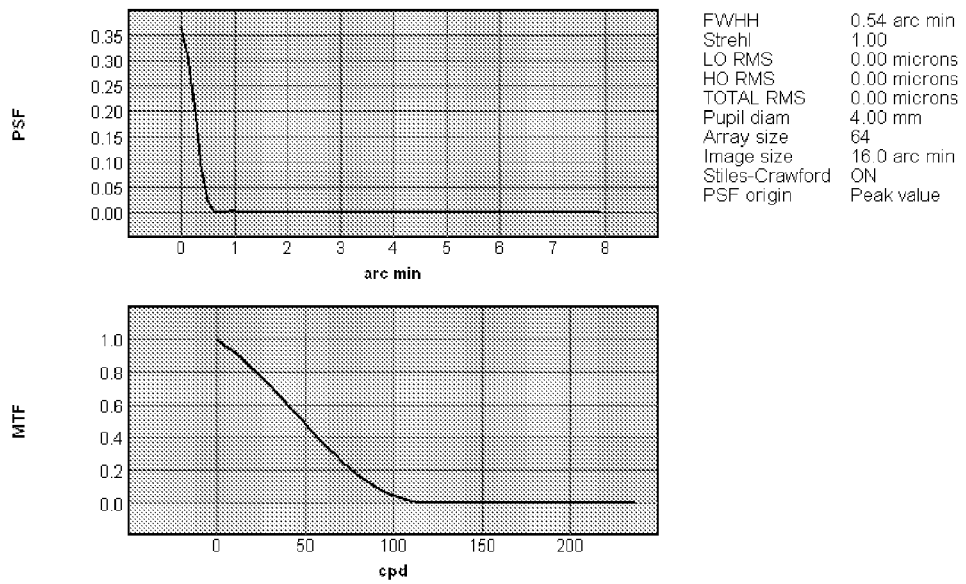
Figure 10:
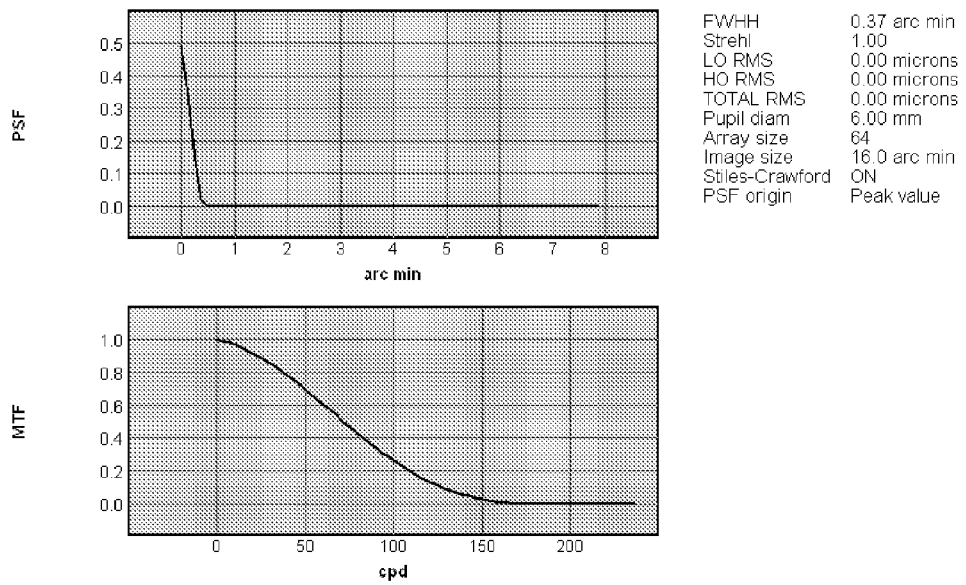
Figure 11:
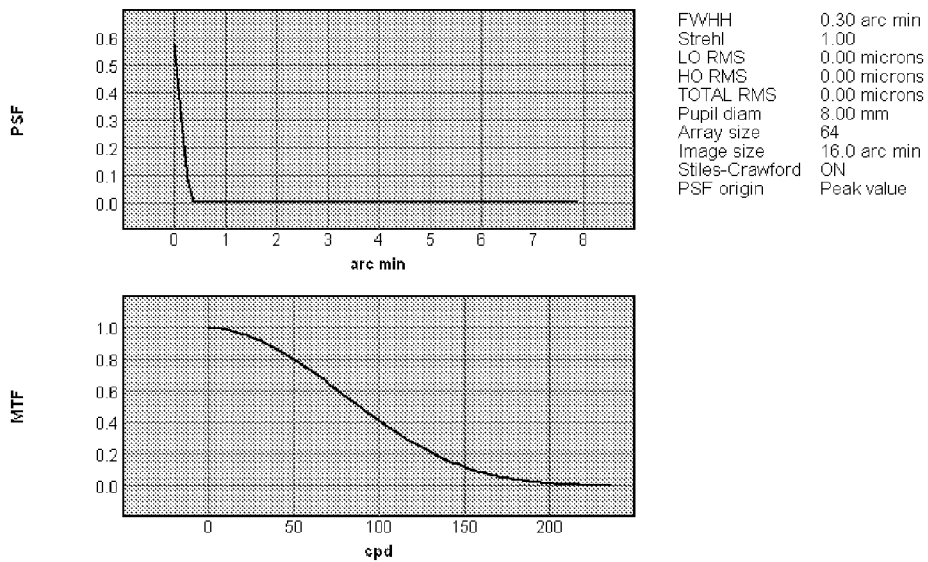

(4) L. Thibos, X. Hong, L. Bradley, X. Cheng, "Statistical variation of aberration structure and image quality in a normal population of healthy eyes," J. Opt Soc Am A, Vol. 19, No. 12 (2002) pp. 2329-2348 (FIG. 9)

(5) David Eliot, Kathy Yang, David Whitaker, "Visual Acuity Changes Throughout Adulthood in Normal, Healthy Eyes: Seeing Beyond 6/6," Opt Vis Sci Vol. 72, No. 3, (1995) pp. 186-191

(6) R. Applegate, "Limits to Vision: Can we do better than nature?" J. Refract Sur, Vol. 16, (September/October 2000) pp. S547-S551

(7) IBID, Applegate (2000) p. 5548

(8) S. Poonja, S. Patel, L. Henry, A. Roorda, "Dynamic visual stimulus presentation in an adaptive optics scanning laser ophthalmoscope," J. Ref. Sur., Vol 21, (September/October 2005) pp. S575-S580

(9) E. A. Rossi, A. Roorda, "The limits of high contrast photopic visual acuity with adaptive optics," Poster 5402, ARVO, May 4, 2006, abstract available at www.iovs.org

(10) W. G. Bachman, T. A. Winegert, C. j. Bassi, "Driver contrast sensitivity and reaction times as measured through a salt-covered windshield," Optometry Vol. 77 (2006) pp 67-70

(11) C. F. Stromeyer, P. Martin, "Human temporal impulse response speeds up with increased stimulus contrast," Vis Research, Vol. 43, No. 3 (2003) pp. 285-98

(12) Simulations made using commercially available software, "VOL-CT," Sarver and Associates, www.sarverassociates.com

(13) L. Thibos, X. Hong, L. Bradley, X. Cheng, "Statistical variation of aberration structure and image quality in a normal population of healthy eyes," J. Opt Soc Am A, Vol. 19, No. 12 (2002) pp. 2329-2348

(14) The prospects for super-acuity: limits to visual performance after correction of monochromatic ocular aberrations, W. N. Charman and N. Chateau, Ophthalmology and Physiological Optics, Vol. 23, 2003, pp. 479-493

(15) Aliasing in human foveal vision, David R. Williams, Vision Research, Vol. 25, No. 2, 1985, pp. 195-205

(16) Learning to Perceive Features below the Foveal Photoreceptor Spacing, M. Fahle, in Perceptual Learning, M. Fahle and T. Poggio, 2002 MIT Press, pp. 197-218

(17) Sarver and Associates, Inc., www.sarverassociates.com

(18) Austin Roorda, "The limits of high contrast photopic letter acuity with adaptive optics," 7th Wavefront Congress, (Jan. 26-29, 2006), http://www.wavefront-congress.org/info/listing.asp under "Ethan Rossi" in Adaptive Optics Applications

(19) I. Lipshitz, "Thirty-four challenges to meet before excimer laser technology can achieve super vision," J. Refract. Sur., Vol. 18 (November/December 2002) pp. 740-743

(20) P. Binder, A. Dreher. Visual Acuity and Contrast Sensitivity in Subjects Using Wavefront Customized Spectacles, 2003 Annual AAO Meeting, Anaheim, Calif.;

J. Jethmalani, J. Chomyn, G. Abdel-Sadek, J. Lemperle, L. Sverdrup, V. Fedoriouk, P. Globerson, P. Binder, S. Lai, A. Dreher. Wavefront Guided Spectacle Lenses for Emmetropes and Myopes. 2004 Annual ARVO Meeting, Fort Lauderdale, Fla.;

J. Sherman, A. Dreher. Night time driving enhancement with iZon lenses. To be submitted, 2006, http://www.optometricmanagement.com/article.aspx?article=71560;

P. Globerson, A. Dreher. Vision Improvement with Wavefront Guided Spectacle Lenses. 2005 Annual AAO Meeting, San Diego, Calif.

(21) M. Webster, M. Georgeson, S. Webster, "Neural adjustments to image blur," Nature Neuroscience, Vol. 5, No. 9 (2002) pp. 839-840

(22) P. Artal, L. Chen, E. Fernandez, B. Singer, S. Manzanera, D. Williams, "Adaptive optics for vision: The eye's adaptation to point spread function," J. Refract. Sur., Vol. 19, (September/October 2003) pp. S585-S587

(23) Nicholas Wade, "An Upright Man," Perception, Vol. 29 (2000) pp. 253-257

(24) Walter Besenmatter, "Recent Progress in Binocular Design," Optics & Photonics News, November 2000, pp. 30-33

(25) www.birdwatching.com/optics

(26) Daniel Vukobratovich, "Binocular performance and design," in Current Developments in Optical Engineering and Commercial Optics, SPIE Vol. 1168, (1989) pp. 338-351

(27) IBID, Vukobratovich 1989

(28) L. P. Osipova, V. V. Potikhonova, "Effect of hand tremor on observation efficiency in binoculars," Sov. J. Opt. Technol., Vol. 58, No. 9 (1991) pp. 542-544

(29) L. P. Osipova, V. V. Potikhonova, "Terrain resolution limit during observations with hand-held binoculars," Sov. J. Opt. Technol., Vol. 58, No. 2 (1991) pp. 88-90

(30) IBID L. P. Osipova, (1991), Vol. 58, No. 2 & No. 8

(31) S. Bara, T Mancebo, E. Moreno-Barriuso, "Positioning tolerances for phase plates compensating aberrations of the human eye," Applied Optics, Vol. 39, No. 19 (2000) pp. 3413-3420

(32) Learning to Perceive Features below the Foveal Photoreceptor Spacing, M. Fahle, in Perceptual Learning, M. Fahle and T. Poggio, 2002 MIT Press, pp. 197-218

(33) Barry Winn, David Whitaker, David B. Elliot, Nicholas J. Phillips, "Factors affecting light-adapted pupil size in normal human subjects," Invest. Ophthalmol. & Visual Sci, Vol 35, No. 3, (1994), pp. 1132-37

(34) www.wickedlasers.com

(35) M. D. Harris, A. E. Lincoln, P. J. Amoroso, B. Stuck, D. Sliney, "Laser Eye Injuries in Military Occupations," Aviat Space and Environ Med, Vol. 74, No. 9 (2003) pp. 947-952

(36) W. N. Charman, N. Chateau, "The prospects for super-acuity: limits to visual performance after correction of monochromatic ocular aberration," Ophthal. Physiol. Opt., Vol. 23, (2003) pp. 479-493

(37) Larry N. Thibos, "Does chromatic aberration hinder or help?" 5th Wavefront Congress, Whistler B C, February 2004, http://129.7.217.162/VOI/index.htm

(38) James S. McLellan et al., "Imperfect optics may be the eye's defense against chromatic blur," Nature, Vol. 417, 9 May 2002, pp. 174-176

(39) IBID, W. N. Charman 2003

(40) J. Sheedy, R. F. Hardy, J. R. Hayes, "Progressive addition lenses—measurements and ratings," Optometry Vol. 77, No. 1 (2006) pp. 23-29

(41) For Instance see A. Guiaro, I. G. Fox, D. R. Williams, "Method for optimizing the correction of the eye's higher-order aberrations in the presence of decentrations," J. Opt. Soc Am A, Vol. 19, No. 1 (2002) pp. 126-128; Ophthonix has a proprietary mathematical method for generating high-order zones with large field-of-view.

(42) Principles of Hartmann-Shack Aberrometry, Larry N. Thibos, Wavefront Sensing Congress, Sante Fe, N. Mex., 2000, http://research.opt.indiana.edu/Library/VSIA/VSIA-2000_SH_tutorial_v2/sld001.htm, Introduction to Wavefront Sensors, Joseph M. Geary, SPIE Press 1995

(43) The self-Imaging Phenomenon and its Applications, Krzysztof Patorski, in Progress in Optics, Vol. XXVII, edited by E. Wolf, North Holland 1989, pp. 1-108

(44) Wavefront Sensor Using Near-Field Diffraction Effects, Larry Horowitz, 5th International Congress on Wavefront Sensing and Optimized Refractive Correction, Whistler, Canada, Feb. 21-23, 2004: US Larry S. Horwitz, System and Method for Wavefront Measurement, U.S. Pat. No. 6,781,681, Aug. 24, 2004

(45) Wavefront Sciences COAS-HD instrument, Albuquerque, N. Mex., 505-275-4747 http://www.wavefrontsciences.com/ophthalmic/COAS-HD.html

(46) Larry N. Thibos, Xin Hong, Clinical Applications of the Shack-Hartmann Aberrometer, Optometery and Vision Science, Vol. 76, No. 12, December 1999

(47) Eyeglass Manufacturing Method using Variable Index Layer, Andreas Dreher, U.S. Pat. No. 6,712,466, Mar. 30, 2004

(48) Achromatic hybrid refractive-diffractive lens with extended depth of focus, Angel Flores, Michael R. Wang, Jame J Yang, Applied Optics, Vol. 43, No. 30, 2004, pp. 5618-5630

(49) Eyeglass Manufacturing Method using Variable Index Layer, Andreas Dreher, U.S. Pat. No. 6,712,466, Mar. 30, 2004

(50) Eyeglass Manufacturing Method Using Variable Index Layer, Andreas W. Dreher, U.S. Pat. No. 6,712,466 (2004); U.S. Pat. No. 6,840,619 (2005); U.S. Pat. No. 6,942,339 (2005); Wavefront Aberrator and Method of Manufacturing, Donald G. Bruns, U.S. Pat. No. 6,813,082 (2004)

We claim:

1. A method of manufacturing an optical element, the optical element improving contrast sensitivity, low-contrast visual acuity, and vernier acuity in one or more eyes of a subject, the method comprising:

obtaining a prescription for the one or more eyes, wherein the prescription comprises corrections for one or more high order aberrations in the subject's one or more eyes, wherein the prescription further comprises an aberration structure beyond a 3 mm diameter of the lens, wherein the aberration structure is selected to maximize a modulation transfer function (MTF) below a Nyquist resolution of the subject's one or more eyes, wherein a Nyquist resolution limit of the Nyquist resolution is a minimum visual acuity measured due to a cone density in a human fovea;

applying the prescription to the optical element, wherein the optical element is configured for use with night vision goggles and further comprises a cured polymer, the cured polymer material comprising a fixed index of refraction, wherein the one or more high order aberrations are symmetrical high order aberrations, and wherein the method further comprises controlling limit aliasing in an image intensifier tube with a modulation transfer function.

2. The method of claim 1, further comprising eliminating or modifying one or more high order aberrations to produce an optimal visual acuity and contrast sensitivity.

3. The method of claim 1, wherein the optical element further comprises a three-layered structure, the method further comprising:

correcting for the one or more low order aberrations of two outer layers of the three-layered structure, wherein a center layer of the three-layered structure comprises a sandwiched cured polymer material that has a fixed index of refraction that corrects the one or more high-order aberrations.

4. The method of claim 1, further comprising correcting aberrations introduced during manufacturing before one or more high order aberrations of the subject's one or more eyes are corrected.

* * * * *